(12) United States Patent
Ezrielev et al.

(10) Patent No.: US 12,481,793 B2
(45) Date of Patent: Nov. 25, 2025

(54) SYSTEM AND METHOD FOR PROACTIVELY IDENTIFYING POISONED TRAINING DATA USED TO TRAIN ARTIFICIAL INTELLIGENCE MODELS

(71) Applicant: Dell Products L.P., Round Rock, TX (US)

(72) Inventors: Ofir Ezrielev, Be'er Sheva (IL); Amihai Savir, Newton, MA (US); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/147,757

(22) Filed: Dec. 29, 2022

(65) Prior Publication Data

US 2024/0220663 A1 Jul. 4, 2024

(51) Int. Cl.
G06F 21/64 (2013.01)

(52) U.S. Cl.
CPC .................................. G06F 21/64 (2013.01)

(58) Field of Classification Search
CPC ...................................................... G06F 21/64
See application file for complete search history.

(56) References Cited

U.S. PATENT DOCUMENTS

| | | | |
|---|---|---|---|
| 10,936,969 B2 | 3/2021 | Patel et al. | |
| 11,087,170 B2 * | 8/2021 | Malaya | G06V 10/764 |
| 11,487,963 B2 * | 11/2022 | Angel | G06N 3/04 |
| 11,544,501 B2 * | 1/2023 | Dong | G06N 3/08 |

(Continued)

FOREIGN PATENT DOCUMENTS

| | | |
|---|---|---|
| WO | 2020040777 A1 | 2/2020 |
| WO | 2021213626 A1 | 10/2021 |

(Continued)

OTHER PUBLICATIONS

Anastasovski, Goce, "Classification of Malicious Web Traffic" (2013), Graduate Theses, Dissertations, and Problem Reports 153 (118 Pages).

(Continued)

Primary Examiner — Rupal Dharia
Assistant Examiner — Devin E Almeida
(74) Attorney, Agent, or Firm — WOMBLE BOND DICKINSON (US) LLP

(57) ABSTRACT

Methods and systems for identifying poisoned training data used for training artificial intelligence (AI) models are disclosed. To identify poisoned training data in a proposed training dataset, a causal model may be obtained. The causal model may include relationships relating data elements. The proposed training dataset may be identified as poisoned when data elements within the proposed training dataset do not satisfy the relationships set forth by the causal model. When the identification of poisoned training data is made, the AI model may not be updated using the proposed training dataset and the proposed training dataset may be discarded. If poisoned training data is not identified prior to training an AI model, methods and systems are disclosed for the remediation of the poisoned training dataset and subsequent tainted AI models. By doing so, the effect of poisoned training data may be prevented and/or efficiently computationally mitigated.

20 Claims, 9 Drawing Sheets

(56) References Cited

U.S. PATENT DOCUMENTS

| | | | |
|---|---|---|---|
| 11,636,726 B2 | | 4/2023 | Purohit |
| 11,645,515 B2 * | | 5/2023 | Angel ............... G06N 3/08 706/12 |
| 11,689,566 B2 * | | 6/2023 | Baracaldo-Angel ............... G06F 18/2113 706/12 |
| 11,785,024 B2 | | 10/2023 | Karam |
| 11,797,672 B1 | | 10/2023 | Beveridge |
| 11,829,193 B2 * | | 11/2023 | Shukla ............... G06N 20/00 |
| 11,847,217 B2 | | 12/2023 | Healy |
| 11,921,903 B1 | | 3/2024 | Beveridge |
| 12,032,541 B2 | | 7/2024 | Hasabnis |
| 12,126,640 B2 | | 10/2024 | Woodworth |
| 12,143,405 B2 | | 11/2024 | Chen Kaidi |
| 2017/0177860 A1 | | 6/2017 | Suarez |
| 2018/0255023 A1 | | 9/2018 | Whaley |
| 2019/0377873 A1 | | 12/2019 | Murphy |
| 2019/0384790 A1 | | 12/2019 | Bequet |
| 2020/0019821 A1 | | 1/2020 | Baracaldo-Angel |
| 2020/0050945 A1 * | | 2/2020 | Chen ............... G06F 18/214 |
| 2020/0057857 A1 | | 2/2020 | Roytman |
| 2020/0082097 A1 * | | 3/2020 | Poliakov ............... G06F 21/577 |
| 2020/0082270 A1 * | | 3/2020 | Gu ............... G06N 3/045 |
| 2020/0134374 A1 * | | 4/2020 | Oros ............... G06N 20/00 |
| 2020/0244674 A1 | | 7/2020 | Arzani |
| 2021/0073685 A1 | | 3/2021 | Veshchikov |
| 2021/0081831 A1 | | 3/2021 | Angel |
| 2021/0209512 A1 * | | 7/2021 | Gaddam ............... H04L 63/1408 |
| 2021/0303695 A1 | | 9/2021 | Grosse |
| 2021/0374247 A1 | | 12/2021 | Sultana |
| 2021/0398020 A1 | | 12/2021 | Ahmad et al. |
| 2022/0166782 A1 | | 5/2022 | Zoldi |
| 2022/0179840 A1 | | 6/2022 | Chatterjee |
| 2022/0368706 A1 | | 11/2022 | Tang |
| 2022/0414492 A1 | | 12/2022 | Jezewski |
| 2023/0004654 A1 | | 1/2023 | Jurzak |
| 2023/0079112 A1 | | 3/2023 | Cheruvu |
| 2023/0134218 A1 | | 5/2023 | Semenov |
| 2023/0148116 A1 | | 5/2023 | Stokes, III |
| 2023/0164162 A1 | | 5/2023 | Lee |
| 2023/0222385 A1 | | 7/2023 | Shimizu |
| 2023/0274003 A1 | | 8/2023 | Liu |
| 2023/0274192 A1 | | 8/2023 | Wang |
| 2024/0015019 A1 | | 1/2024 | Sneider |
| 2024/0020580 A1 | | 1/2024 | Brower |
| 2024/0048977 A1 | | 2/2024 | Marzban |
| 2024/0119153 A1 | | 4/2024 | Ludmir |
| 2024/0364534 A1 | | 10/2024 | Ezrielev |
| 2025/0053664 A1 | | 2/2025 | Cameron |
| 2025/0055762 A1 | | 2/2025 | Walker |

FOREIGN PATENT DOCUMENTS

| | | |
|---|---|---|
| WO | 2022/216142 A1 | 10/2022 |
| WO | 2023111287 A1 | 6/2023 |

OTHER PUBLICATIONS

Joshi, Naveen, "Is The Data Used For Training Your Machine Learning Model Safe?", Technology For You, Jul. 28, 2022, <https://www.technologyforyou.org/is-the-data-used-for-training-your-machine-learning-model-safe/> (3 Pages).

Wang, Siruo et al., "Methods for correcting inference based on outcomes predicted by machine learning." Proceedings of the National Academy of Sciences 117.48 (2020): 30266-30275. (10 Pages).

Rauschmayr, Nathalie et al., "Detecting and analyzing incorrect model predictions with Amazon SageMaker Model Monitor and Debugger", AWS Machine Learning Blog, Jul. 9, 2020, <https://aws.amazon.com/blogs/machine-learning/detecting-and-analyzing-incorrect-model-predictions-with-amazon-sagemaker-model-monitor-and-d%E2%80%A6/> (13 Pages).

Higgins, Kelly Jackson, "Honeypot Stings Attackers With Counterattacks", Dark Reading, Mar. 26, 2013, <https://www.darkreading.com/vulnerabilities-threats/honeypot-stings-attackers-with-counterattacks> (4 Pages).

Susmelj, Igor, "The Data You Don't Need: Removing Redundant Samples", Towards Data Science, Mar. 19, 2020, <https://towardsdatascience.com/the-data-you-don-t-need-removing-redundant-samples-6bfd07c1516c> (10 Pages).

Paduraru, Ciprian, Marius-Constantin Melemciuc, and Bogdan Ghimis. "Fuzz Testing with Dynamic Taint Analysis based Tools for Faster Code Coverage." ICSOFT 19 (2019): 82-93. (Year: 2019).

Jiang, Bingchen, and Zhao Li. "Defending Against Backdoor Attack on Graph Nerual Network by Explainability." arXiv preprint arXiv: 2209.02902, 10 pages, (Year: 2022).

Raghavan, Vijay, Thomas Mazzuchi, and Shahram Sarkani. "Discover Artificial Intelligence: An improved real time detection of data poisoning attacks in deep learning vision systems", 17 pages, Discover 2022, (Year: 2022).

Albert Cheng, "The Machine Learning Minefield—How to Avoid Getting Hit by Machine Learning Poisoning", Mar. 22, 2022, retrieved from <https://ayc-data.com/data_science/2022/03/22/data-poisoning.html> on May 1, 2025 (10 pages).

Zhang et al., "FL Detector: Defending Federated Learning Against Model Poisoning Attacks via Detecting Malicious Clients", Available at https://arxiv.org/abs/2207.092009 (Year: 2022), (11 pages).

Tran et al., "Manipulating Machine Learning Poisoning Attacks and Countermeasures for Regression Learning", 32nd Conference on Neural Information Processing Systems (NeurIPS 2018), Montreal, Canada; 2018, pp. 1-11 (Year: 2018), (11 pages).

Zeng et al., "CNNComparator: Comparative Analytics of Convolutional Neural Networks", arXiv: 1710.05285v1 [cs.LG] Oct. 15, 2017, pp. 1-5 (Year: 2017), (5 pages).

Hendrycks et al., "Natural Adversarial Examples", arXiv:1907.07174v4[cs.LG] Mar. 4, 2021; pp. 1-16 (Year:2021), (16 pages).

Xu et al., "Feature Squeezing: Detecting Adversarial Examples in Deep Neural Networks", In Network and Distributed Systems Security Symposium (NDSS) 2018, San Diego, Feb. 2018; arXiv:1704.01155v2 [cs.CV] Dec. 5, 2017; pp. 1-15 (Year: 2018), (15 pages).

Lao; "Reorienting Machine Learning Education Towards Tinkerers and ML-Engaged Citizens", Doctoral Dissertation; Massachusetts Institute of Technology, Department of Electrical Engineering and Computer Science; 2020; pp. 165-167 (Year: 2020), (223 pages).

* cited by examiner

SYSTEM AND METHOD FOR PROACTIVELY IDENTIFYING POISONED TRAINING DATA USED TO TRAIN ARTIFICIAL INTELLIGENCE MODELS

FIELD

Embodiments disclosed herein relate generally to artificial intelligence (AI) models. More particularly, embodiments disclosed herein relate to systems and methods to manage instances of AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
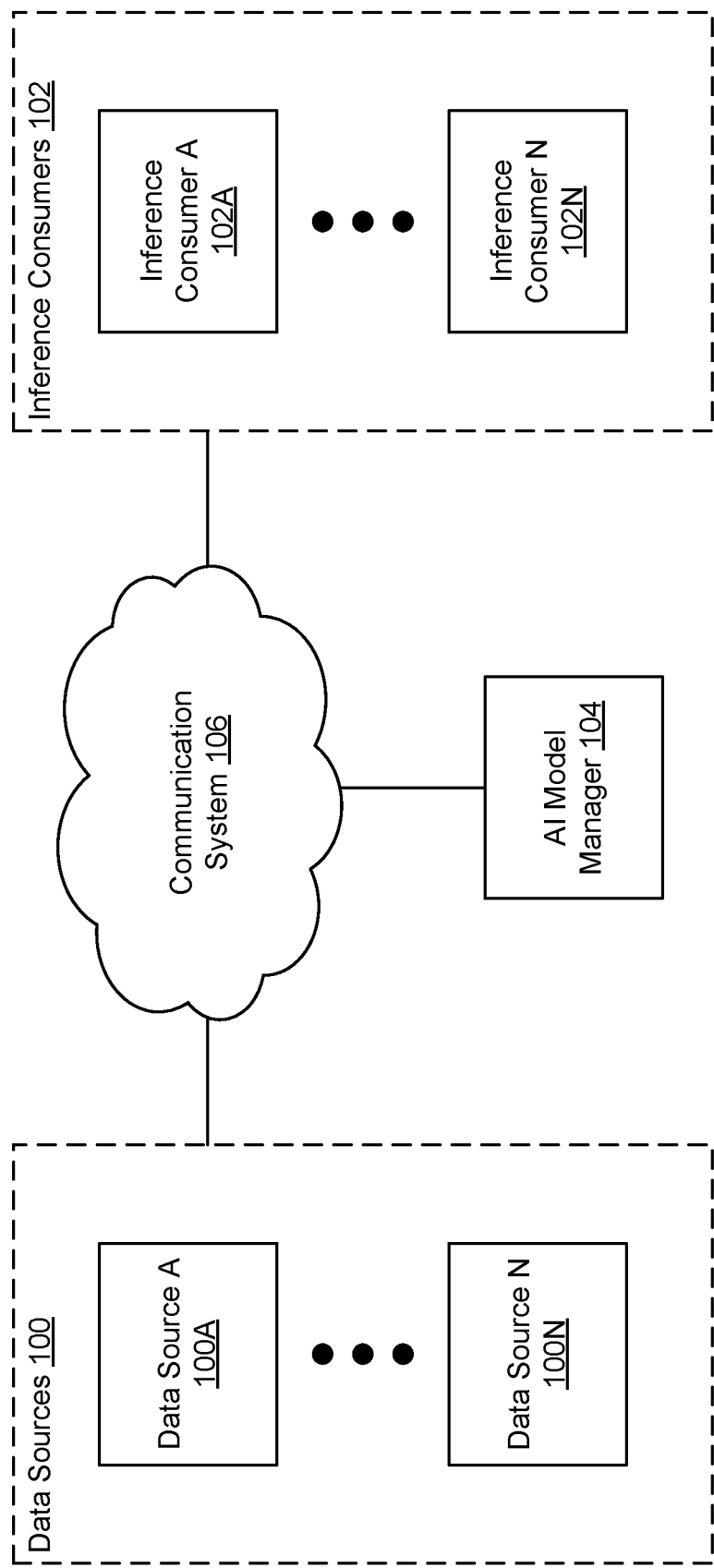
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for identifying poisoned training data used to train AI models. Trained AI models may provide computer-implemented services (e.g., inference generation) for downstream consumers (e.g., inference consumers). A data processing system may, over time, update AI models through training using training data. However, if poisoned training data is introduced to the AI model, the AI model may become untrustworthy (e.g., the AI model may be tainted by the poisoned training data). Inferences generated using the tainted AI model may also be untrustworthy or inaccurate.

Once it has been discovered that an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation. In other words, computing resources spent re-training AI models may interrupt inference consumption and/or other types of computer-implemented services that may otherwise be provided using the computing resources dedicated to re-training.

Once the AI model is retrained, any and/or all inferences provided to inference consumers using the tainted AI model may require replacement. Inference generation may be required for an entire ingest dataset, prompting another inefficient use of computing resources.

To prevent the introduction of poisoned training data to an AI model, relationships between a plurality of data elements of the training dataset may be analyzed using known causal relationships derived from causal modeling. If the relationships between given data elements of the training dataset do not satisfy known causal relationships, the training dataset may be identified as being poisoned.

However, poisoned training data may not be detected prior to its introduction to an AI model (e.g., before poisoned training data is used to train the AI model). In this case, to reduce computing resources spent re-training AI models, an AI model snapshot may be obtained periodically throughout the AI model training process. The snapshot may store information regarding the structure of the AI model, which may be used to restore a partially trained untainted AI model. The restored AI model may require training using only a subset of the original training dataset, thereby requiring fewer computational resources than re-training an AI model from scratch using the entire training dataset. Thus, reverting to a last known good AI model may require less resource expenditure than re-training an AI model from scratch.

The snapshot may also store information regarding poisoned inferences obtained from the tainted AI model. This information may be used to (i) identify poisoned inferences generated from the tainted AI model, (ii) replace poisoned inferences already provided to the inference consumer, and/or (iii) identify poisoned training data being used to train the tainted AI model. By identifying the poisoned inferences, only a portion of the ingest dataset may be required to generate replacement inferences. The identification of poisoned training data during the training process may allow for a more efficient remediation of the AI model and the training dataset itself.

By doing so, embodiments disclosed herein may provide a system for identifying poisoned training data used to train AI models, and computationally efficiently mitigating the impact of the poisoned training data. By training a causal model using trusted (e.g., unpoisoned) training data, the derived causal relationships may be used to determine if newly acquired training data is poisoned prior to training an AI model. However, in the case that poisoned training data is not detected prior to being used to train an AI model, the computational resources typically associated with repairing the tainted AI model may be reduced, leaving more resources for inference generation.

In an embodiment, a method for identifying poisoned training data used for training an AI model is provided. The method may include making an identification that a second training dataset usable to retrain a first instance of the AI model is available. Based on the identification, the method may also include: identifying a causal relationship within a first training dataset, the first training dataset being used to train the first instance of the AI model; and making a determination regarding whether the causal relationship is violated by the second training dataset.

In a first instance of the determination where the causal relationship is not violated by the second training dataset, the method may include obtaining a second instance of the AI model by further training the AI model using the second training dataset.

In a second instance of the determination where the causal relationship is not violated by the second training dataset, the method may include treating the second training dataset as being poisoned.

The method may further include obtaining the first instance of the AI model, and obtaining a causal model based on the first training dataset, the causal model comprising the causal relationship.

Identifying the causal relationship within the first training dataset may include: identifying a first variable from a first plurality of variables of the first training dataset and a second variable from the first plurality of variables of the first training dataset; and reading the causal relationship from a causal model, the causal relationship defining a functional relationship between the first variable and the second variable.

Making the determination regarding whether the causal relationship is violated by the second training dataset may include: identifying a third variable and a fourth variable from a second plurality of variables of the second training dataset, the third variable and the fourth variable being analogous to a first variable and a second variable of the first training dataset, respectively; and making a second determination regarding whether the third variable and the fourth variable satisfy the causal relationship.

Treating the second training dataset as being poisoned may include passing on a retraining opportunity for the AI model presented by the second training dataset.

Passing on the retraining opportunity may include discarding the second training dataset.

Passing on the retraining opportunity may further include generating an inference using the first instance of the AI model after an identification that the second training dataset is available has been made.

The method may further include, in the first instance of the determination, generating a second inference using the second instance of the AI model after the identification has been made.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the AI models, existing AI models may be used as a basis for new AI models thereby leveraging the existing resource expenditures used to obtain the existing AI models. For example, updating instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance.

In general, embodiments disclosed herein may provide methods, systems, and/or devices for managing AI models. The AI models may be managed in a manner that allows for the impact of poisoned training data to be identified and remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, (vii) remediate the AI model when poisoned training data has been used to update the AI model, and/or (viii) generate snapshots for the AI model as it is updated over time.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot). Using incremental snapshots may improve efficiency as they may use fewer computing resources (e.g., data transfer and/or data storage) than a full snapshot. Generating snapshots of the AI model over time may allow for the impact of poisoned data to be computationally efficiently mitigated.

AI model manager may also (i) obtain a causal model, (ii) obtain a trained causal model, and/or (iii) obtain a relationship definition (e.g., a causal relationship) from the trained causal model. The relationship(s) obtained from the trained causal model may be used to identify poisoned training data. The poisoned training dataset may be identified before it is used to train an AI model, preventing the need to remediate a tainted AI model instance (e.g., an AI model instance that has been trained using poisoned training data).

To remediate the AI model, AI model manager 104 may identify when poisoned training data has been used to update the AI model. To identify poisoned training data, AI model manager 104 may verify that causal relationships from a trained causal model are satisfied by the examples from a training dataset, discussed further with respect to FIG. 2B.

However, in the event that poisoned training data is present but is not identified through causal relationships, the effects of poisoned training data may be tracked to facilitate remediation of the AI model. To do so, snapshots of the AI model may include information relating to (i) data sources 100 that provided training data and/or ingest data to the AI model, and/or (ii) inference consumers 102 that have already or may consume inferences generated by the AI model.

To mitigate the impact of poisoned training data, AI model manager 104 may obtain a poisoned data notification. When a poisoned data notification is identified, AI model manager 104 may use the snapshots to (i) revert an existing AI model instance to a previous AI model instance that is not tainted by the poisoned data, (ii) update the previous AI model instance to obtain an updated AI model instance that is not tainted by the poisoned data, (iii) identify poisoned inferences provided by the existing AI model inference (and/or previous versions that were also tainted by the poisoned data), (iv) obtain replacement inferences using the updated AI model instance, (v) delete the identified poisoned inferences, and/or (vi) notify inference consumers 102 of the poisoned inferences.

By doing so, embodiments disclosed herein may reduce inference supply interruptions to inference consumers 102 by reducing computing resources used for retraining poisoned AI models.

In order to obtain a trained AI model instance, AI model manager 104 may obtain an AI model and a training dataset. The training dataset may be obtained through multiple data sources 100. Data sources 100 may include any number of data sources (e.g., 100A, 100N). For example, an AI model may be used for facial recognition; that is, identifying a person from an image or video. In this example, the AI model may be a deep learning model type and data sources may include multiple social media platforms. A training dataset may be created by collecting images or video of a person who has already been identified by a user. The training dataset may then be used to train an instance of the AI model.

Further, in order to obtain an inference from the trained AI model instance, other data may be collected from the same data sources 100 or another data source. Continuing with the above example, another data source 100 may be a security camera. The ingest dataset may include images or video of the same person not identified by a user. An inference (e.g., an identification of the person) may be obtained from the trained instance of the AI model after ingesting the ingest dataset, and the inference may be distributed to inference consumers 102.

Inference consumers 102 may include any number of inference consumers (e.g., 102A, 102N). Inference consumers 102 may include businesses, individuals, or computers that may use the inference data to improve and/or automate decision-making. In the above example, the inference consumer may be law enforcement attempting to identify a person, and/or the inference consumer may offer computer-implemented services for businesses in order to determine which products may appeal to a potential customer.

To prevent poisoned inference distribution to inference consumers 102, AI model manager 104 may obtain a trained causal model. To obtain a trained causal model, AI model manager 104 may obtain a causal model and a training dataset. The training dataset may be obtained through multiple data sources (e.g., 100A, 100N). To identify the presence of poisoned training data, relationships from the trained causal model may be used to validate a new training dataset (e.g., new training data collected from data sources 100 that does not include the training data used to train the causal model).

While the example supplied is with respect to AI facial recognition, it will be appreciated that an AI model may be used to achieve other types of goals.

When performing its functionality, one or more of AI model manager 104, data sources 100, and inference consumers 102 may perform all, or a portion, of the methods and/or actions shown in FIGS. 2A-3C.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be used to identify poisoned training data and/or reduce the computational cost for mitigating the impact of poisoned training data used train AI models. The following operations described in FIGS. 2A-2D may be performed by the system in FIG. 1 when providing this functionality.

Figure 2A:
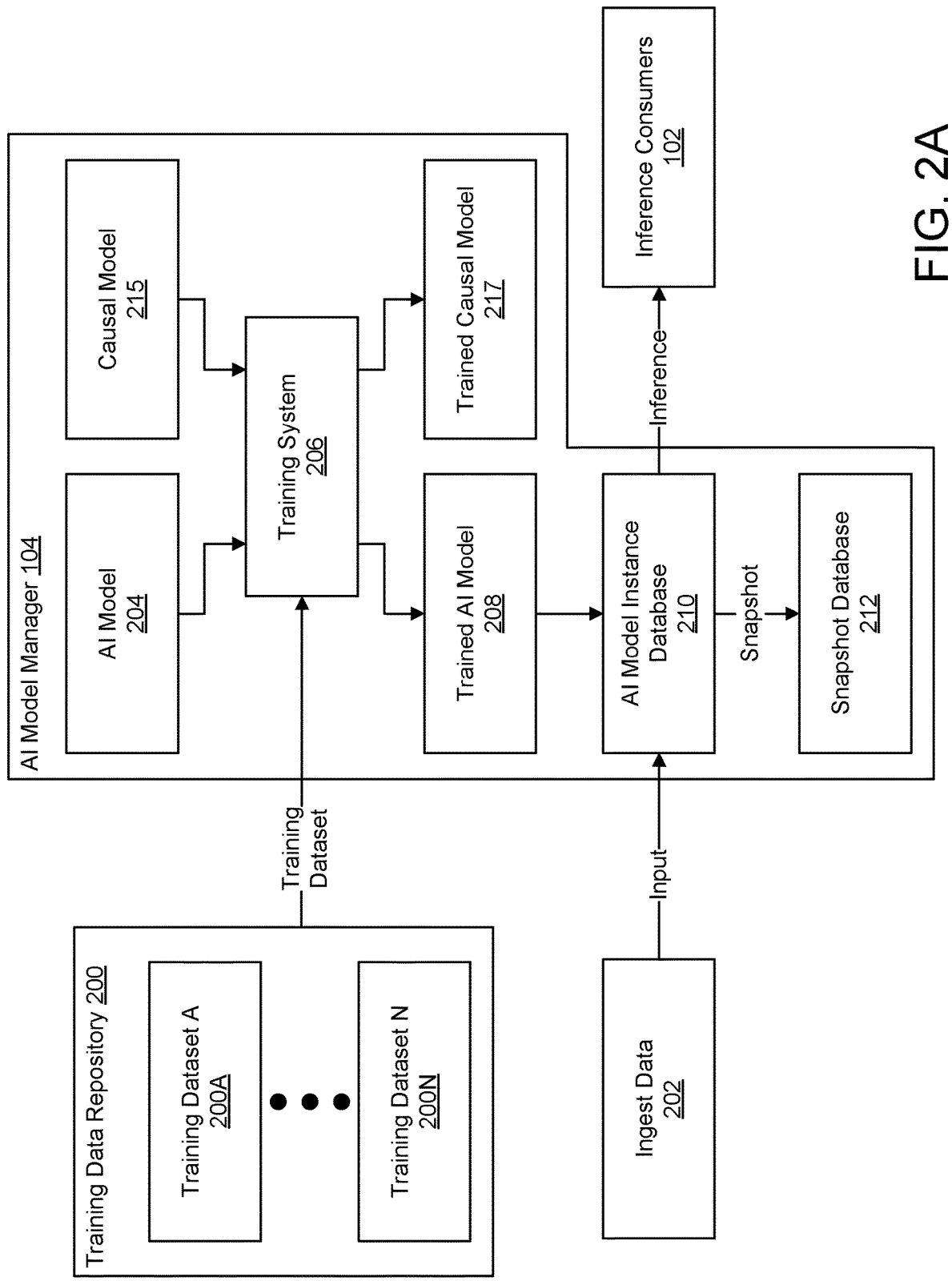
FIG. 2A shows a data flow diagram illustrating an AI model management system in accordance with an embodiment.

FIG. 2A shows a data flow diagram in accordance with an embodiment. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume facial recognition services for images or video of an unidentified person. Facial recognition services may be provided by using AI models that have been trained to identify a person based on facial attributes.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of facial recognition, training data repository 200 may include images or video of a person who has already been identified by a user. The relationship between the images or video and the identification may be a portion of labeled data. Any of the training datasets (e.g., 200A) from training data repository 200 may relate the facial attributes of a person to their identifier (e.g., name, username, etc.) thereby including any number of portions of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the facial recognition services example, ingest data 202 may include images of an unidentified person. Ingest data 202 may be used by AI model manager 104 to obtain the name of the unidentified person (e.g., through ingestion by an AI model).

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the facial recognition services example, trained AI model 208 may be a trained facial recognition AI model, trained to map the facial attributes captured in images of a person to the name of the person.

AI model manager 104 may also include causal model 215. Causal model 215 may be trained using training system 206 and a training dataset (e.g., an existing training dataset from training data repository 200) to produce trained causal model 217. Trained causal model 217 may include information that defines relationships between any number of variables (e.g., input attributes from input data) from the training dataset, and/or other relationship definitions supplied by any other data source.

In the context of facial recognition services, trained causal model 217 may be trained to relate variables that describe facial attributes to one another. For example, the relationship may be that the visual appearance of the size of a person's dimples on their face is proportional to an intensity of a smile that the person is displaying. This relationship may then be used, for example, to identify that pictures where the person is intensely smiling but is not displaying dimples is likely to be artificial, manipulated, and/or otherwise not representative of real pictures of the person. Accordingly, these pictures may be treated as being poisoned.

To provide facial recognition services, AI model manager 104 may train any number of AI models which may generate inferences usable to identify persons in images. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the identity of persons depicted in ingest data 202.

Once selected, ingest data 202 may be input to a trained AI model instance to generate an inference. AI model manager 104 may obtain the inference, which may be provided to inference consumers 102. In the facial recognition example, an image of an unidentified person may be input to the trained facial recognition AI model, the name of the unidentified person may be obtained by AI model manager 104, and the name of the unidentified person may be provided to an inference consumer such as a law enforcement agency.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212 and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance.

Thus, as illustrated in FIG. 2A, the system of FIG. 1 may provide inferences using trained AI models. However, if poisoned training data is used to train an instance of an AI model, the resulting tainted AI model may not be trustworthy for inference generation. To reduce the likelihood of obtaining a tainted AI model through training, new training data (e.g., newly collected training data that has not yet been used for training the AI model) may be managed to identify the presence of poisoned training data.

Figure 2B:
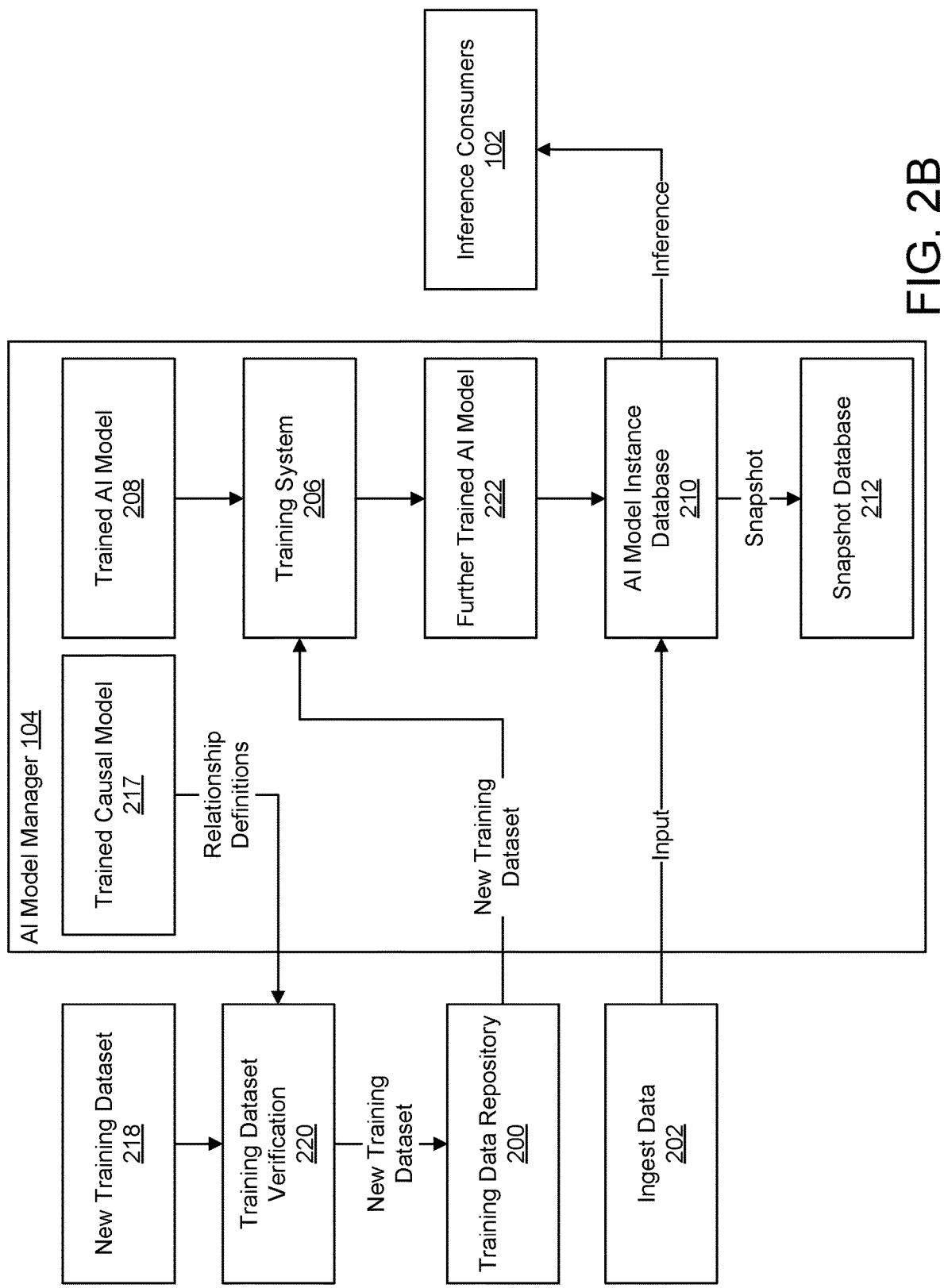
FIG. 2B shows a data flow diagram illustrating an AI model management system managing training data in accordance with an embodiment.

FIG. 2B shows a data flow diagram in accordance with an embodiment. The data flow diagram may illustrate an AI model management system managing training data used to update (e.g., further train) a trained AI model. As new training data becomes available over time, new training dataset 218 may be formed from various data sources 100. New training dataset 218 may undergo training dataset verification 220, where a determination may be made whether new training dataset 218 includes poisoned training data.

Training dataset verification 220 may use relationship definitions from trained causal model 217 (e.g., trained using existing training data from data repository 200) to make the determination of whether new training dataset 218 includes poisoned training data. The relationship definitions from trained causal model 217 may relate input attributes (e.g., variables) from the existing training dataset to one another (e.g., known relationships). The relationship definitions may define a causal relationship, where a second variable is the result of the occurrence of at least the first variable. The relationship definitions may be used to test new training dataset 218 (e.g., new training data that does not include the existing training data) for poisoned training data.

Though new training dataset 218 may not include existing training data from training dataset repository 200, new training dataset 218 may include training data with similar input attributes (e.g., variables) to the existing training dataset. The relationship definitions from trained causal model 217 may be used to test the similar variables from new training dataset 218, where, in the event that the similar variables from new training dataset 218 do not satisfy the known relationships (e.g., outside of a tolerance), then new training dataset 218 may be treated as poisoned.

However, in the event that the similar variables from new training dataset 218 do satisfy the known relationships (e.g., within a tolerance), new training dataset 218 may be treated as unpoisoned. New training dataset 218 may be stored in training data repository 200 and may be later used to update (e.g., further train) trained AI model 208 using training system 206.

Further trained AI model 222 may be trained using new training dataset 218 and its instance may be stored in AI model instance database 210. As described in FIG. 2A, further trained AI model 222 (e.g., having been trained using unpoisoned training data) may be used to generate trustworthy inferences using ingest data 202, the unpoisoned inferences being provided to inference consumers 102.

However, if poisoned training data is not identified prior to being used to train an AI model, the subsequently trained AI models may be tainted AI models that may no longer generate reliable inferences. To manage inference generation when poisoned trained AI models are identified, the snapshots of snapshot database 212 may be used to computationally efficiently restore inference generation functionality, manage poisoned inferences, and/or otherwise mitigate the impact of poisoned training data.

Figure 2C:
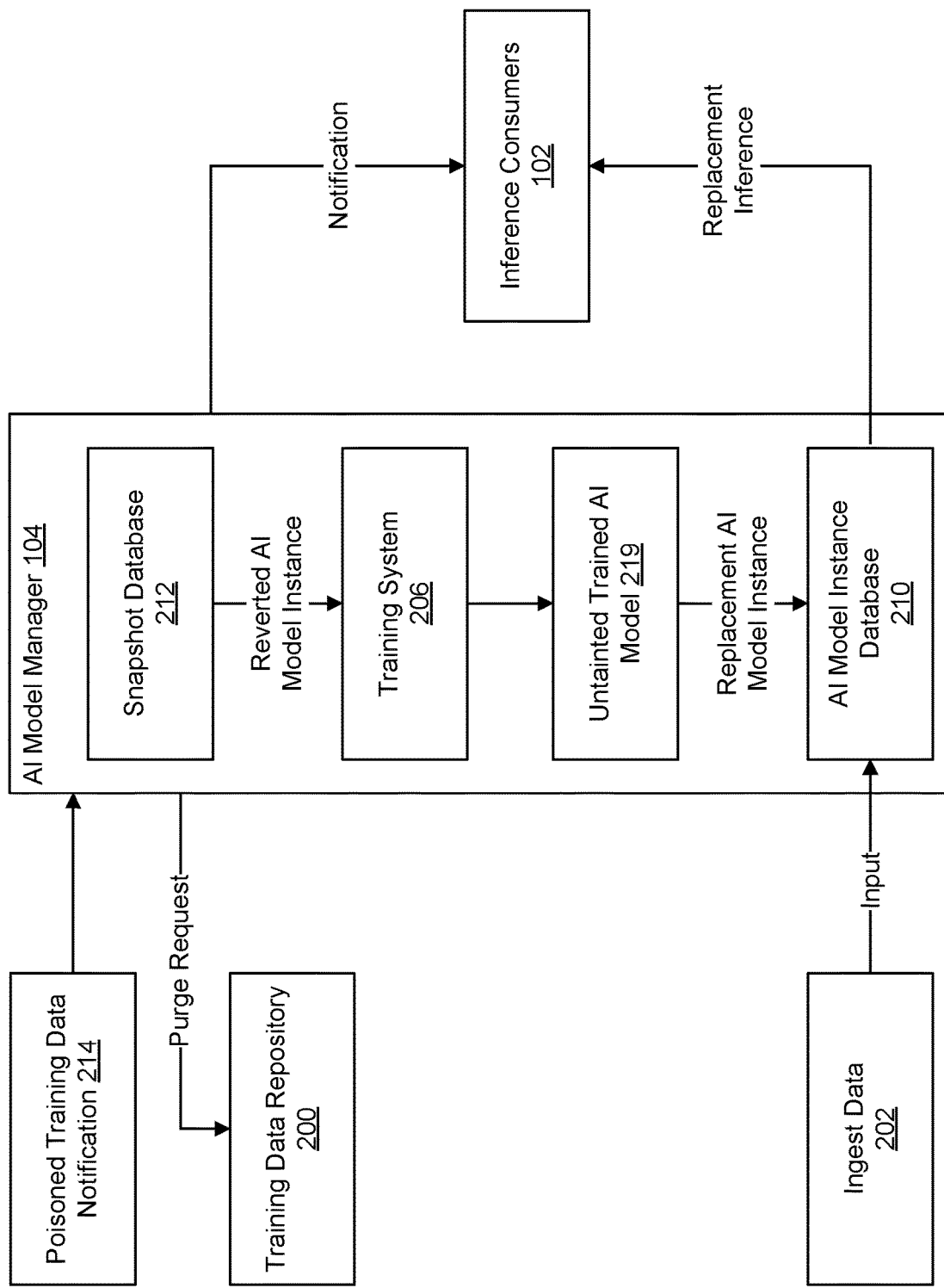
FIG. 2C shows a data flow diagram illustrating an AI model management system managing poisoned training data in accordance with an embodiment.

Turning to FIG. 2C, a second data flow diagram in accordance with an embodiment is shown. In the event that a training dataset that has been used to train an AI model instance is identified as poisoned, AI model manager 104 may obtain poisoned training data notification 214. Poisoned training data notification 214 may be generated using information in snapshot database 212, either internally, or by another source and/or device. Poisoned training data notification 214 may include information that identifies components associated with a trained AI model that are impacted by poisoned training data used to obtain the trained AI model.

The components may include (i) a poisoned portion of a training dataset, (ii) a tainted trained AI model instance associated with the poisoned portion of the training dataset, (iii) a poisoned inference associated with the tainted AI model instance, (iv) a time period associated with the poisoning (e.g., the time when the poisoned training data is introduced to the AI model, and/or the time the poisoning is remediated), and/or (v) a data source 100 that supplied the poisoned training data.

For example, in the context of facial recognition services, a poisoned portion of a training dataset may be an image of a person who has been incorrectly identified (e.g., incorrectly labeled). In this example, an incorrectly labeled image may be referred to as a "bad image." Training a facial recognition AI model using one or more bad images may result in a tainted facial recognition AI model that misclassifies ingested data (e.g., a picture displaying certain facial attributes) as being associated with persons that do not have the facial attributes and/or similar facial attributes included in the ingested data. The tainted facial recognition AI model may generate a poisoned inference that leads to an incorrect identification of a person depicted in a video.

Once the components are identified and to mitigate the impact of the components, AI model manager 104 may (i) send a notification to inference consumers 102 regarding the poisoned inference, (ii) send a purge request to training data repository 200 regarding the poisoned portion of the training dataset, and/or (iii) revert a tainted AI model instance to a previous AI model instance. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., retraining/updating may not remove the effect of the poisoned training data on the future operation of the trained AI model). The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create updated training data repository 216, shown in FIG. 2D. Updated training data repository 216 may not include any portions of poisoned training data. An updated training dataset from updated training data repository 216 may be used to train an untainted AI model instance that is trustworthy for inference generation.

Figure 2D:
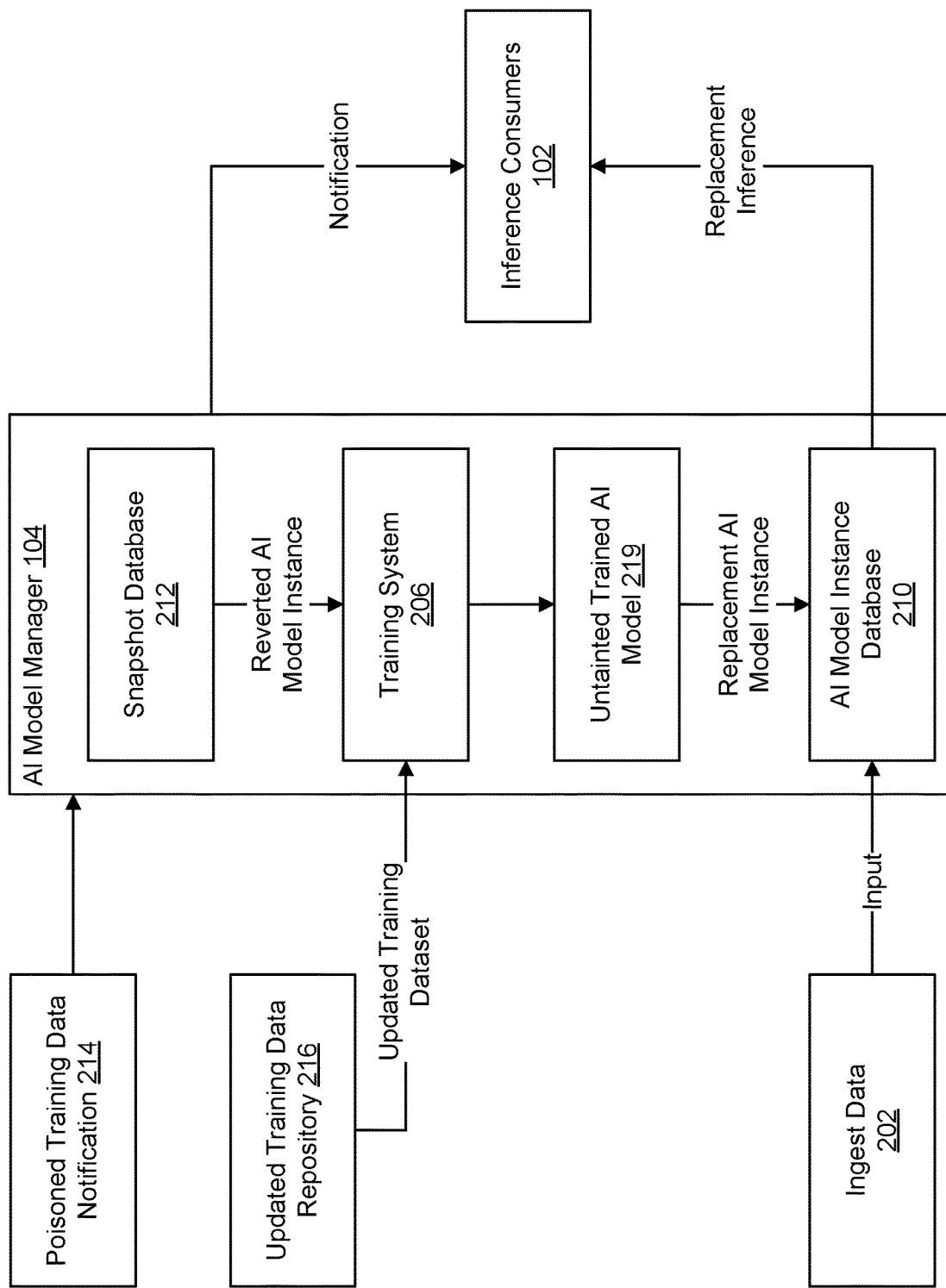
FIG. 2D shows a data flow diagram illustrating an AI model management system managing and remediating poisoned training data in accordance with an embodiment.

Keeping with FIG. 2D, a fourth data flow diagram in accordance with an embodiment is shown. To obtain untainted trained AI model 219, training system 206 may use an updated training dataset to train a reverted AI model instance (e.g., a last known good AI model instance). To reduce computational resources during AI model training, the updated training dataset used to train a reverted AI model instance may only include training data not already used to train the reverted AI model instance (e.g., training data input to training system 206 after the poisoned training data). AI model manager may then replace a tainted trained AI model instance stored in AI model instance database 210 with untainted trained AI model 219.

Like removal of the poisoned training data to reduce the impact of the poisoned training data on operation of the system, untainted trained AI model 219 may be used to generate a replacement inference for a poisoned inference (e.g., generated by the tainted trained AI model) by ingesting a portion of ingest data 202 (e.g., which may have been used to generate the poisoned inference). AI model manager 104 may then provide the replacement inference to inference consumers 102 and/or otherwise use the replacement inference to reduce the impact of the poisoned inference.

For example, returning to the facial recognition services example, AI model manager 104 may send a notification to law enforcement (e.g., an inference consumer) regarding the incorrect identification of the person, and training data repository 200 may be updated by removing the one or more bad images. Consequently, updated training data repository 216 may be used to train a reverted facial recognition AI model (e.g., a last known good facial recognition AI model) without the impact of the poisoned training data. The reverted facial recognition AI model may be trained using only the portion of images and/or video from the updated training data repository that have not been previously used to update the reverted facial recognition AI model. Once trained, the untainted facial recognition AI model may ingest the video depicting the person and send an updated identification to law enforcement.

While a facial recognition service example is supplied to help describe FIGS. 2A-2D, it should be appreciated that the data flows illustrating AI model management in FIGS. 2A-2D may be used to achieve other types of goals without departing from embodiments disclosed herein.

Figure 3A:
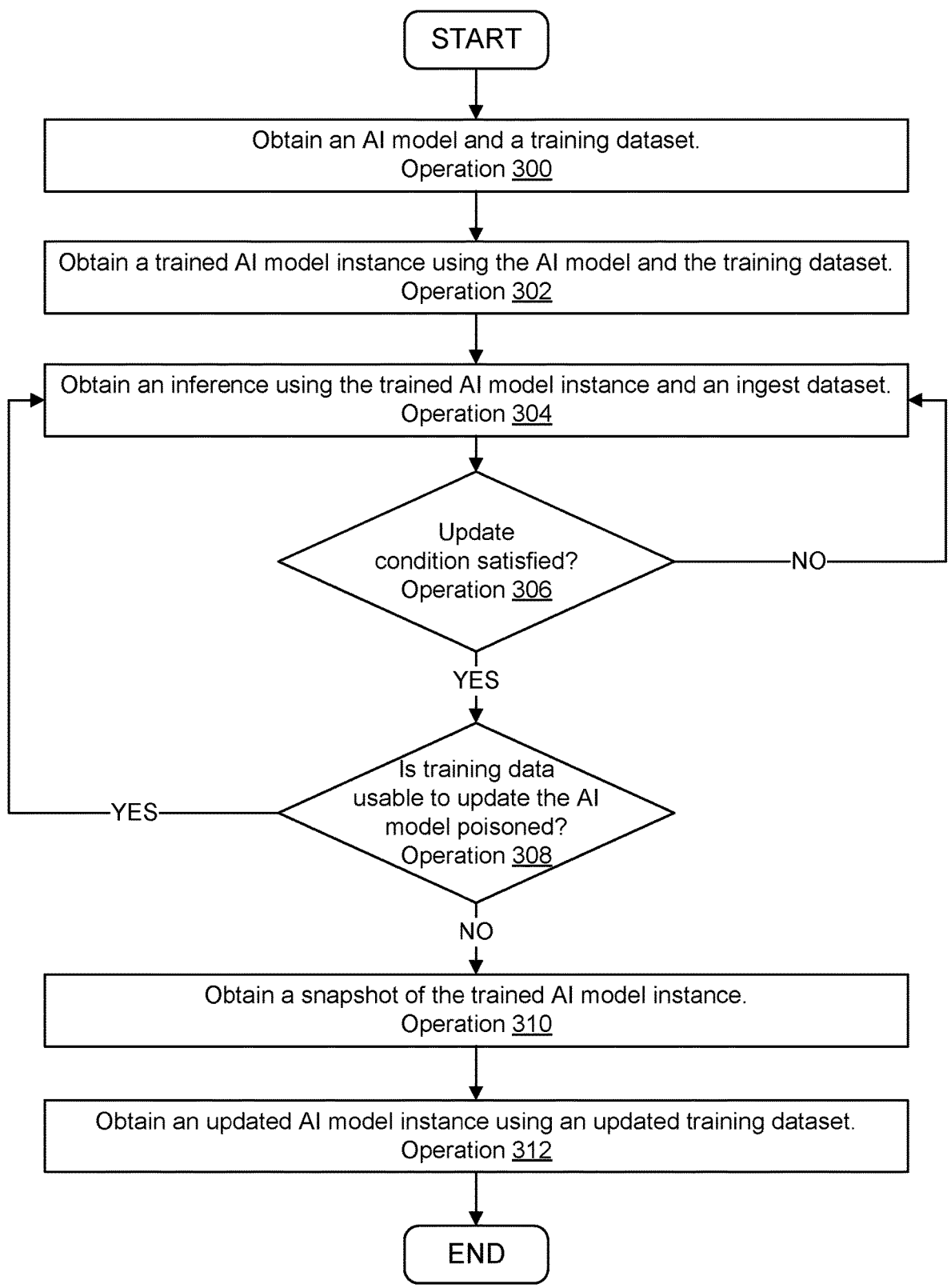
FIG. 3A shows a flow diagram illustrating a method of updating an AI model instance in accordance with an embodiment.
Figure 3B:
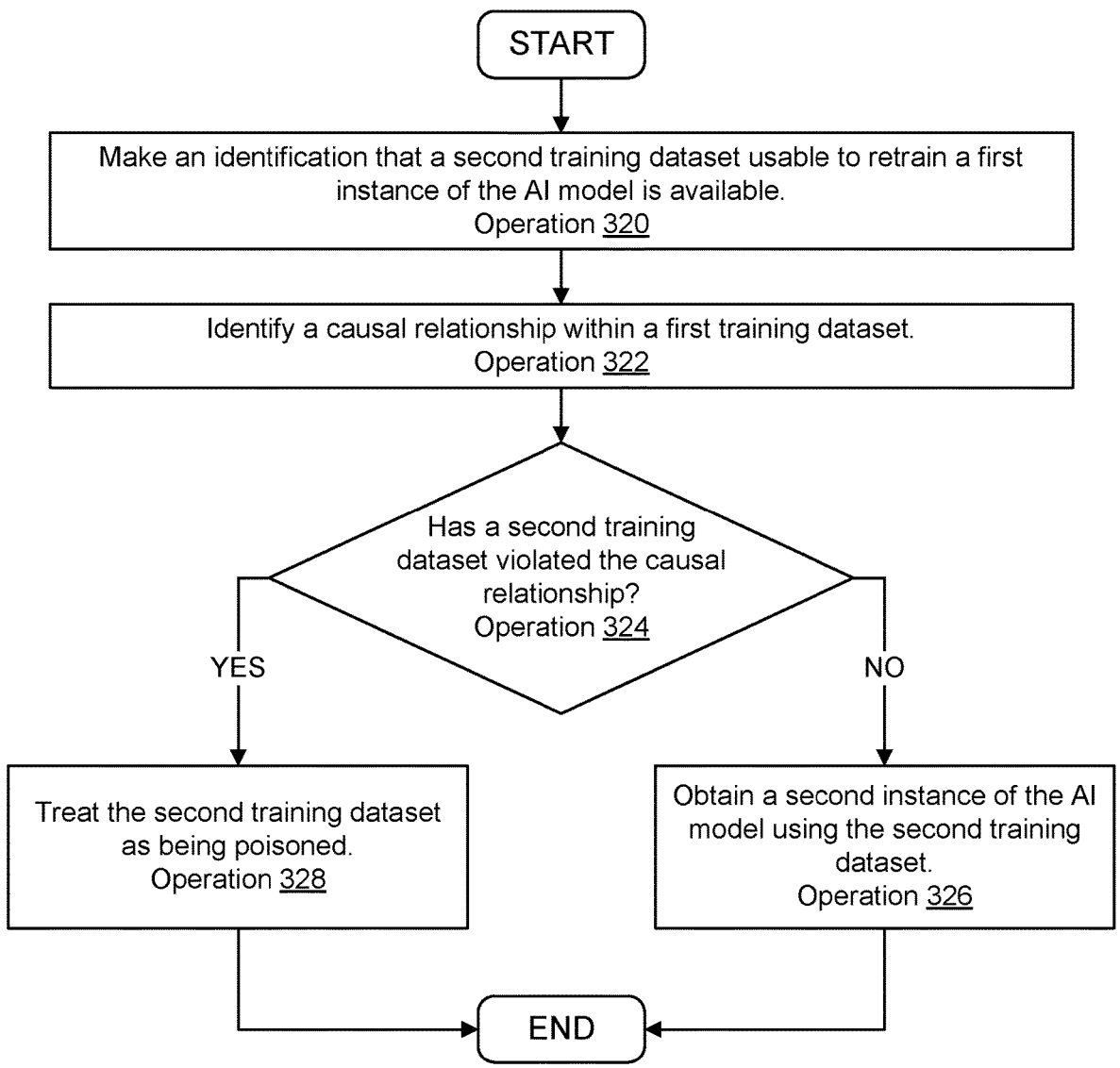
FIG. 3B shows a flow diagram illustrating a method of identifying poisoned training data in accordance with an embodiment.
Figure 3C:
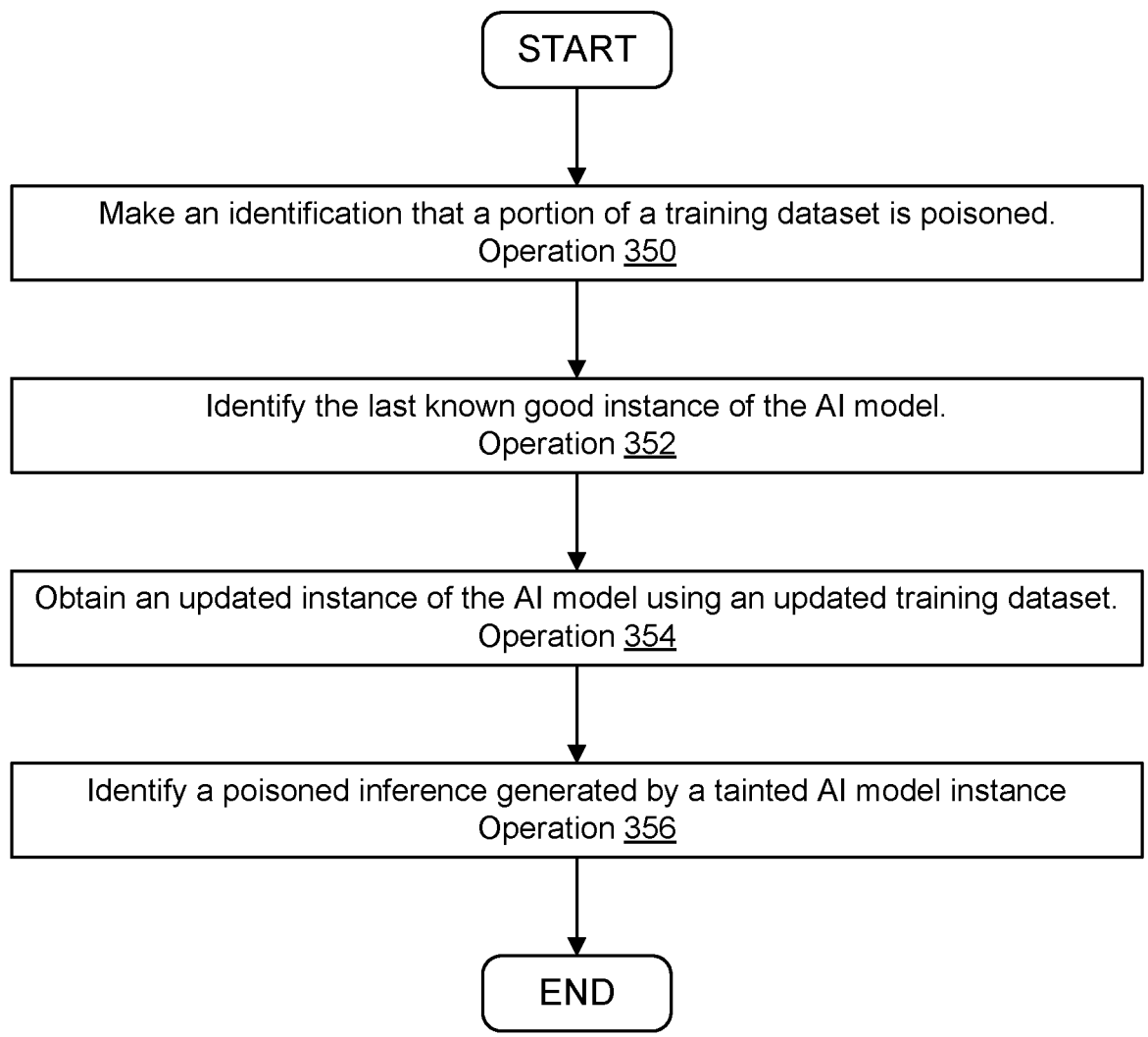
FIG. 3C shows a flow diagram illustrating a method of managing poisoned training data in accordance with an embodiment.

As discussed above, the components of FIG. 1 may perform various methods to manage AI models. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2D. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

For example, the update condition may be satisfied if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a determination is made regarding whether training data usable to update the AI model is poisoned. The determination may be made via the method illustrated in FIG. 3B.

If it is determined that the training data includes poisoned training data, then the method may return to operation 304. If it is determined that the training data does not include poisoned training data, then the method may proceed to operation 310 following operation 308.

At operation 310, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, (iv) metadata identifying data sources from which training data has been collected, and/or (v) metadata identifying the input used to generate the inference.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a weight of a first element in a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing (i) an identifier for an input used to obtain the inference, (ii) an identifier for the inference, (iii) identification information for the inference consumer, (iv) a time stamp indicating when the inference was generated, and/or (v) other attributes of the inference (e.g., a confidence score). Attributes of the inferences, such as confidence scores, may be used to identify hard examples. Any number of snapshots of AI model instances may be stored in a snapshot database.

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, and/or (iii) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 312, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Using the method illustrated in FIG. 3A, a system in accordance with embodiments disclosed herein may be placed in condition to (i) identify poisoned training data by storing information usable to identify the poisoned training data, (ii) mitigate the impact of poisoned training data through proactive preparation for model revision, retraining, and poisoned inference identification to address instances where poisoned training data is used to update inference models, and/or (iii) reduce the likelihood of poisoned training data being used to update inference models (e.g., through proactive identification).

Turning to FIG. 3B, a flow diagram illustrating a method of identifying poisoned training data which may be used for training an AI model in accordance with an embodiment is shown. The method may be performed by a data processing system, and/or another device.

At operation 320, an identification that a second training dataset usable to retrain a first instance of the AI model is available is made. The identification may be made by establishing that (i) a sufficient amount of new training data (e.g., the second training dataset) has been collected from data sources 100 for the purposes of updating the first instance of the AI model, (ii) the accuracy of inferences generated from the first instance of the AI model is unsatisfactory (e.g., AI model drift has occurred), (iii) the first instance of the AI model should be updated according to a schedule, (iv) the first instance of the AI model should be updated based on compliance with a specification, and/or (v) other factors indicate that the second training data set is usable to retrain (e.g., update) the first instance of the AI model.

At operation 322, based on the identification made at operation 320, a causal relationship within a first training dataset is identified. The causal relationship may be identified by training a causal model to establish causal relationships between variables of the first training dataset. To do so, a causal model may be obtained by (i) reading the causal model from storage, (ii) receiving the causal model from another device, and/or (iii) generating the causal model, for example by programming a data processing system and/or another device.

The causal model may include a structure that relates a node (e.g., a first variable from a first plurality of variables of the first training dataset) to another node (e.g., a second variable from the first plurality of variables of the first training dataset) via an edge (e.g., a relationship).

The causal model may be trained using the first training dataset and may be a trained causal model. Training the causal model may include updating a relationship associated with an edge (e.g., updating a function and/or a value). The first training dataset used to train the trained causal model may not include poisoned training data (e.g., so that a causal relationship later obtained from the trained causal model can be considered a trustworthy causal relationship). The trained causal model may include any number of causal relationships between variables of the first plurality of variables of the first training dataset (e.g., known causal relationships).

The causal relationship may define a functional relationship between a first variable and a second variable of the first plurality of variables. The functional relationship may indicate that an occurrence of the first variable is the result of the second variable. The first variable and the second variable may be unidimensional arrays of data (e.g., a list of data elements), and a dependent relationship (e.g., a causal relationship) may exist between the data elements of each of the arrays. However, it will be appreciated that the variables may be higher dimensional without departing from embodiments disclosed herein, and are described with respect to unidimensional arrays of data here merely for clarity.

The causal model may be trained through automated procedures (e.g., computational analysis of the training data to identify relationships), through subject matter expert analysis (e.g., persons reviewing and analyzing the training data to identify the relationships), and/or a combination of automated and subject matter expert analysis (e.g., automated identification of potential relationships and pruning by a subject matter expert).

At operation 324, a determination regarding whether the causal relationship is violated by the second training dataset is made. The determination may be made by testing the causal relationship identified in operation 322 using variables from the second training dataset to identify whether the causal relationship holds true in the second training dataset. To do so, a third variable and a fourth variable from a second plurality of variables of the second training dataset may be identified. The third variable and the fourth variable may be analogous to the first variable and the second variable, respectively.

The third variable and the fourth variable may, for example, be unidimensional arrays of data and data elements of each of the arrays may depend on one another (e.g., may exhibit causal relationships). To test the causal relationship established in operation 322 using the third variable and the fourth variable, the data elements of the third variable may be transformed based on the causal relationship. The transformed data elements of the third variable may be compared to the data elements of the fourth variable. Any number of variables (e.g., data elements from any number of variables) may be compared to one another. For example, multiple variables may be compared to a single variable, and/or multiple variables may be compared to multiple variables.

If the transformed data elements of the third variable are similar to the data elements of the fourth variable (e.g., within a tolerance), the causal relationship may be considered satisfied and it may be determined that the second training data set has not violated the causal relationship. If the transformed data elements of the third variable do not match the data elements of the fourth variable (e.g., outside of a tolerance), the causal relationship may be considered unsatisfied, and it may be determined that the second training data has violated the causal relationship.

If the second training data set has violated the causal relationship, then the method may proceed to operation 328 following operation 324. If the second training data set has not violated the causal relationship, then the method may proceed to operation 326 following operation 324.

At operation 326, a second instance of the AI model is obtained using the second training dataset (e.g., by treating the second training data set as being unpoisoned, thereby following the NO path after operation 308 in FIG. 3A). The second instance of the AI model may be obtained by further training (e.g., updating) the first instance of the AI model from operation 320 (e.g., as part of operation 312). For example, the second instance of the AI model may be trained as part of the method illustrated in FIG. 3A. The second instance of the AI model may be trained to relate pieces of data from the second training dataset using a training system, (e.g., analogous to operations 302 and 312).

The further trained second instance of the AI model may be considered untainted (e.g., having been trained using unpoisoned training data) and may be used to generate inferences that may be provided to inference consumers 102.

The method may end following operation 326.

Returning to operation 324, the method may proceed to operation 328 following operation 324 when the second training dataset has violated the causal relationship.

At operation 328, the second training dataset is treated as being poisoned. The second training dataset may be treated as being poisoned by (i) passing on the retraining opportunity (e.g., an update condition may not be satisfied, such as the condition described at operation 306 from FIG. 3A), (ii) discarding the second training dataset (e.g., not including the second training dataset in the training data repository), (iii) continuing to use the first instance of the AI model for inference generation (e.g., to continue supplying unpoisoned inferences to inference consumers), and/or (iv) identify and/or flag a data source from which the second training dataset was collected to raise the level of future analysis of training data from these data sources.

The method may end following operation 328.

While the method illustrated in FIG. 3B may be used to proactively identify and prevent training of AI models with some poisoned training, the method may not be foolproof and other types of poisoned training data (e.g., not detectable via causal relationship analysis) may be used to train inference models. If poisoned training data is used to train an AI model, the poisoned portion of the training data, tainted AI models, and/or tainted inferences may be remediated, at least in part, via the method illustrated in FIG. 3C. The poisoned portion of the training data may also be remediated via other methods.

Turning to FIG. 3C, a flow diagram illustrating a method of managing poisoned training data in accordance with an embodiment is shown. The method may be performed by a data processing system, and/or another device.

At operation 350, an identification may be made that a portion of a training dataset used to train an AI model is poisoned. The identification may be made by (i) receiving the identification from another entity, and/or (ii) reading the identification from storage. The identification may be made, for example, by performing various analysis of attributes of AI model instances, of training data and/or operation of entities from which the training data may be obtained.

At operation 352, the last known good instance of the AI model is identified. The last known good instance of the AI model may be identified by identifying the first AI model instance trained using the poisoned training dataset, identifying a second AI model instance trained before the first AI model instance (e.g., that is not trained using the poisoned training dataset), and using the second AI model instance as the last known good instance of the AI model.

At operation 354, an updated instance of the AI model is obtained using an updated training dataset. The updated training dataset may be obtained by reading training data from an updated training data repository. The updated training data repository may be obtained by removing the identified poisoned training dataset (e.g., from operation 350) from an existing training data repository so that the updated training repository may be free of poisoned training data.

The updated instance of the AI model may be obtained by further training (e.g., updating) the last known good instance of the AI model from operation 352. The updated instance of the AI model may be trained to relate pieces of data from the updated training dataset from operation 354, using a training system, (e.g., analogous to operations 302 and 310). The resulting trained updated instance of the AI model may be used to obtain unpoisoned inferences (e.g., replacement inferences and/or new inferences).

At operation 356, a poisoned inference is identified. The poisoned inference may be a hard example and/or may be identified by accessing information stored in a snapshot of a tainted AI model instance. The snapshot of the tainted AI model instance may include associations (e.g., stored metadata) between the tainted AI model and any inference (e.g., a poisoned inference) generated by the tainted AI model. Once identified, the poisoned inference may be remediated.

The poisoned inference may be remediated by (i) notifying an inference consumer that consumed the poisoned inference, of the poisoned inference, (ii) obtaining a replacement inference (e.g., using the last known good instance of the AI model and the ingest dataset used to obtain the poisoned inference), (iii) providing the replacement inference to an inference consumer that consumed the poisoned inference, (iv) deleting the poisoned inference from an inference repository, and/or (v) retaining the unpoisoned inference.

The method may end following operation 356.

Figure 4:
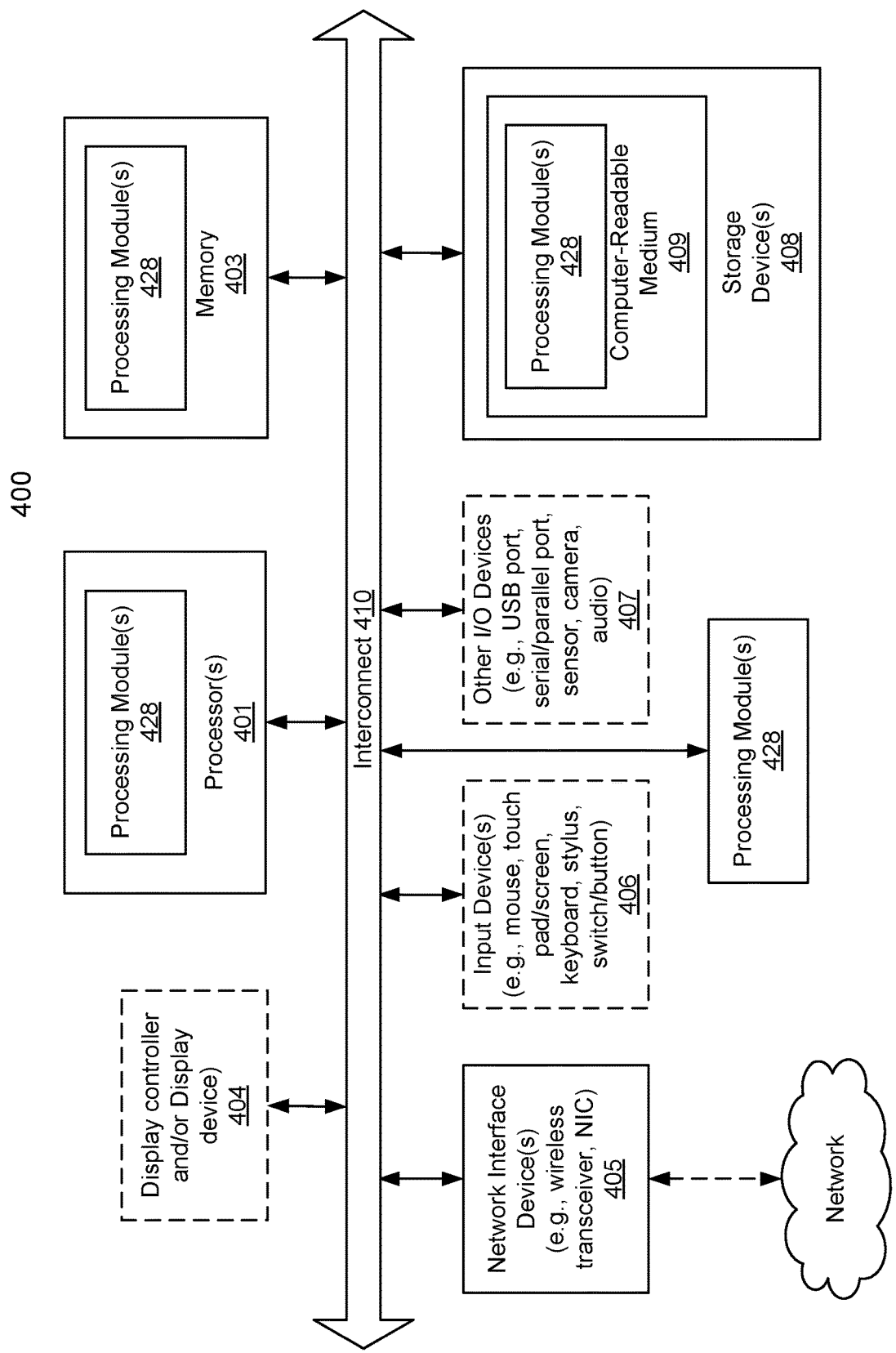
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such, details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for identifying poisoned training data used for training an artificial intelligence (AI) model, comprising:
   making an identification that a second training dataset usable to retrain a first instance of the AI model is available; and
   determining, based on the identification and before using the second training dataset to retrain the first instance of the AI model, whether the second training dataset is poisoned by, at least:
   identifying a causal relationship within a first training dataset, the first training dataset being used to train the first instance of the AI model, and
   identifying a third variable and a fourth variable from a second plurality of variables of the second training dataset, the third variable and the fourth variable being analogous to a first variable and a second variable of the first training dataset, respectively; and
   transforming data elements of the third variable based on the causal relationship to obtained transformed data elements of the third variable
   comparing the transformed data elements of the third variable to data elements of the fourth variable to make a determination regarding whether the third variable and the fourth variable satisfy the causal relationship,
   in a first instance of the determination where the third variable and the fourth variable satisfy the causal relationship:
   treating the second training dataset as not being poisoned, and
   retraining the first instance of AI model using the second training dataset to obtain a second instance of the of the AI model; and
   in a second instance of the determination where the third variable and the fourth variable do not satisfy the causal relationship:
   treating the second training dataset as being poisoned.

2. The method of claim 1, further comprising, after making the identification and before using the second training dataset to retrain the first instance of the AI model:
   obtaining the first instance of the AI model; and
   obtaining a causal model based on the first training dataset, the causal model comprising the causal relationship.

3. The method of claim 1, wherein identifying the causal relationship within the first training dataset comprises:
   identifying a first variable from a first plurality of variables of the first training dataset and a second variable from the first plurality of variables of the first training dataset; and
   reading the causal relationship from a causal model, the causal relationship defining a functional relationship between the first variable and the second variable.

4. The method of claim 1, wherein treating the second training dataset as being poisoned comprises passing on a retraining opportunity for the AI model presented by the second training dataset.

5. The method of claim 4, wherein passing on the retraining opportunity comprises discarding the second training dataset.

6. The method of claim 1, wherein the causal relationship is identified using a causal model comprising nodes and edges between the nodes, the nodes correspond to portions of the first training data set, and the edges between the nodes correspond to relationships between the portions of the first training data set corresponding to the nodes.

7. A non-transitory machine-readable medium having instructions stored therein, which when executed by a processor, cause the processor to perform operations for identifying poisoned training data used for training an artificial intelligence (AI) model, the operations comprising:
making an identification that a second training dataset usable to retrain a first instance of the AI model is available; and
determining, based on the identification and before using the second training dataset to retrain the first instance of the AI model, whether the second training dataset is poisoned by, at least:
identifying a causal relationship within a first training dataset, the first training dataset being used to train the first instance of the AI model, and
identifying a third variable and a fourth variable from a second plurality of variables of the second training dataset, the third variable and the fourth variable being analogous to a first variable and a second variable of the first training dataset, respectively; and
transforming data elements of the third variable based on the causal relationship to obtained transformed data elements of the third variable
comparing the transformed data elements of the third variable to data elements of the fourth variable to make a determination regarding whether the third variable and the fourth variable satisfy the causal relationship,
in a first instance of the determination where the third variable and the fourth variable satisfy the causal relationship:
treating the second training dataset as not being poisoned, and
retraining the first instance of AI model using the second training dataset to obtain a second instance of the of the AI model; and
in a second instance of the determination where the third variable and the fourth variable do not satisfy the causal relationship:
treating the second training dataset as being poisoned.

8. The non-transitory machine-readable medium of claim 7, the operations further comprising:
obtaining the first instance of the AI model; and
obtaining a causal model based on the first training dataset, the causal model comprising the causal relationship.

9. The non-transitory machine-readable medium of claim 7, wherein identifying the causal relationship within the first training dataset comprises:
identifying a first variable from a first plurality of variables of the first training dataset and a second variable from the first plurality of variables of the first training dataset; and
reading the causal relationship from a causal model, the causal relationship defining a functional relationship between the first variable and the second variable.

10. The non-transitory machine-readable medium of claim 7, wherein treating the second training dataset as being poisoned comprises passing on a retraining opportunity for the AI model presented by the second training dataset.

11. The non-transitory machine-readable medium of claim 10, wherein passing on the retraining opportunity comprises discarding the second training dataset.

12. The non-transitory machine-readable medium of claim 7, wherein the causal relationship is identified using a causal model comprising nodes and edges between the nodes, the nodes correspond to portions of the first training data set, and the edges between the nodes correspond to relationships between the portions of the first training data set corresponding to the nodes.

13. The non-transitory machine-readable medium of claim 7, wherein making the identification comprises, at least:
determining that a predetermined amount of new training data for retraining the first instance of the AI model has been collected from data sources; and
using the predetermined amount of the new training data as the second training dataset.

14. A data processing system, comprising:
a processor; and
a memory coupled to the processor to store instructions, which when executed by the processor, cause the processor to perform operations for identifying poisoned training data used for training an artificial intelligence (AI) model, the operations comprising:
making an identification that a second training dataset usable to retrain a first instance of the AI model is available, and
determining, based on the identification and before using the second training dataset to retrain the first instance of the AI model, whether the second training dataset is poisoned by, at least:
identifying a causal relationship within a first training dataset, the first training dataset being used to train the first instance of the AI model, and
identifying a third variable and a fourth variable from a second plurality of variables of the second training dataset, the third variable and the fourth variable being analogous to a first variable and a second variable of the first training dataset, respectively; and
transforming data elements of the third variable based on the causal relationship to obtained transformed data elements of the third variable
comparing the transformed data elements of the third variable to data elements of the fourth variable to make a determination regarding whether the third variable and the fourth variable satisfy the causal relationship,
in a first instance of the determination where the third variable and the fourth variable satisfy the causal relationship:
treating the second training dataset as not being poisoned, and
retraining the first instance of AI model using the second training dataset to obtain a second instance of the of the AI model; and
in a second instance of the determination where the third variable and the fourth variable satisfy the causal relationship:
treating the second training dataset as being poisoned.

15. The data processing system of claim 14, the operations further comprising:
- obtaining the first instance of the AI model; and
- obtaining a causal model based on the first training dataset, the causal model comprising the causal relationship.

16. The data processing system of claim 14, wherein identifying the causal relationship within the first training dataset comprises:
- identifying a first variable from a first plurality of variables of the first training dataset and a second variable from the first plurality of variables of the first training dataset; and
- reading the causal relationship from a causal model, the causal relationship defining a functional relationship between the first variable and the second variable.

17. The data processing system of claim 14, wherein treating the second training dataset as being poisoned comprises passing on a retraining opportunity for the AI model presented by the second training dataset.

18. The data processing system of claim 17, wherein passing on the retraining opportunity comprises discarding the second training dataset.

19. The method of claim 1, wherein making the identification comprises, at least:
- determining that a predetermined amount of new training data for retraining the first instance of the AI model has been collected from data sources; and
- using the predetermined amount of the new training data as the second training dataset.

20. The data processing system of claim 14, wherein making the identification comprises, at least:
- determining that a predetermined amount of new training data for retraining the first instance of the AI model has been collected from data sources; and
- using the predetermined amount of the new training data as the second training dataset.

* * * * *